UNITED STATES PATENT OFFICE.

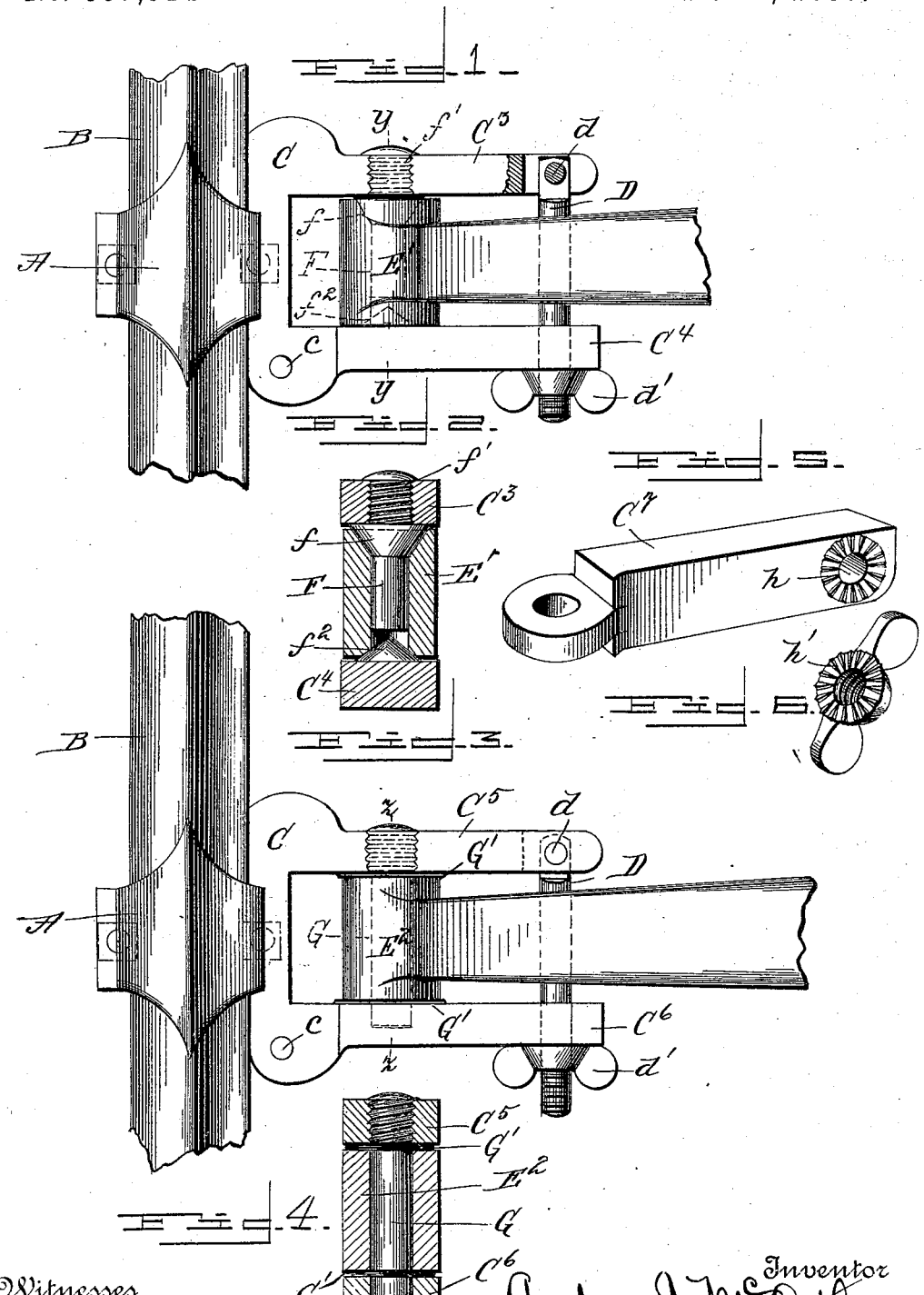

ANDREW J. McARTHUR, OF GAINESVILLE, FLORIDA.

THILL-COUPLING.

SPECIFICATION forming part of Letters Patent No. 557,314, dated March 31, 1896.

Application filed April 11, 1894. Serial No. 507,134. (No model.)

*To all whom it may concern:*

Be it known that I, ANDREW J. MCARTHUR, a citizen of the United States, residing at Gainesville, in the county of Alachua and State of Florida, have invented certain new and useful Improvements in Thill-Couplings; and I do hereby declare the following to be a full, clear, and exact description of the invention, such as will enable others skilled in the art to which it appertains to make and use the same.

My invention is an improvement in thill-couplings; and it consists in the novel features hereinafter described, reference being had to the accompanying drawings, which illustrate several forms in which I have contemplated embodying my invention, and said invention is fully disclosed in the following description and claims.

Referring to the said drawings, Figure 1 is a top plan view of a thill-coupling embodying my invention. Fig. 2 is a vertical transverse section on line $y\ y$, Fig. 1. Fig. 3 is a similar view of a modified form of coupling embodying said invention. Fig. 4 is a section similar to Fig. 2 on line $z\ z$, Fig. 3. Figs. 5 and 6 are details of parts of the mechanism.

The object of my invention is to provide a thill-coupling which will permit the thills to be quickly and easily disengaged therefrom and a tongue substituted, or vice versa, and which at the same time will prevent rattling at the connection between the coupling and the shaft or tongue and thus avoid the necessity of using additional antirattling parts or devices.

In the form of my invention shown in Figs. 1 and 2 of the drawings, A represents the clip, of ordinary construction, by means of which my improved coupling is secured to the axle B, a portion of which is shown in the drawings.

C is the back plate of the coupling, which may be formed integrally with the clip A, as shown, or separately, as preferred. Extending forwardly from this backing-plate C are two parallel arms $C^3\ C^4$, one (or both) of which is pivoted to the said backing-plate. In the drawings I have shown the arm $C^3$ formed integrally with the backing-plate and the arm $C^4$ hinged or pivoted to said plate at $c$, and this is my preferred construction.

The rigid arm $C^3$ is provided with a support for the coupling-piece secured to the shafts or thill, consisting of a bolt F extending to a point adjacent to the movable arm $C^4$. The bolt F has its base portion adjacent to the rigid arm broadened at $f$ into a cone shape, and has a stem $f'$ which is secured to the rigid arm $C^3$ by screw-threading the said stem and providing a screw-threaded aperture in arm $C^3$, or by riveting or upsetting its outer end, or by both, as preferred. The movable arm $C^4$ is shown as provided with a short cone bearing or support $f^2$, which engages the opposite side of the coupling-piece $E'$ secured to the shaft, and the two arms $C^3\ C^4$ are coupled together adjustably by a pivoted bolt D and nut $d'$.

The bolt D is pivotally secured to the rigid arm $C^3$ in this instance, and the pivoted arm $D^4$ is provided with an aperture or recess to engage the free end of said bolt, which is screw-threaded to engage the nut $d'$ provided with a milled or winged head by means of which the pivoted arm $C^4$ can be adjusted with respect to the arm $C^3$ so as to clamp the coupling-piece $E'$ of the shaft or pole.

It will be seen that the bolt F extends almost entirely through the aperture in the coupling-piece and thus forms a rigid support for the same, which would hold the said coupling-piece from dropping off, even though the nut $d'$ should become loosened and drop off and allow the pivoted arm $C^4$ to swing off. This form of coupling may also be employed with shafts or poles provided with the ordinary coupling-pieces now in common use.

In Figs. 3 and 4 I have shown a slightly-modified form of coupling in which the rigid arm $C^5$ is provided with a support consisting of a straight bolt G, secured thereto in the manner described with reference to the bolt F, Figs. 1 and 2, and of such length as to extend into a socket or recess formed in the movable arm, the said bolt passing entirely through the coupling-piece $E^2$. Between the ends of the coupling-piece $E^2$ and the arms $C^5\ C^6$, I prefer to place rubber, leather or other elastic washers $G'\ G'$, which prevent rattling. The parts are clamped together by the pivoted bolt D and nut $d'$, as in the form shown in Figs. 1 and 2, and the nut can be screwed up to give the required compression of the rubber or other elastic washers G'. It will be seen that in this form, also, should the screw d' of one of the couplings become loosened and drop off, the coupling-piece supported thereby would not fall, as the supporting-bolt is in each case secured to the rigid arm and passes entirely or substantially through the coupling-piece, and the shafts or pole cannot be disconnected unless both couplings are loosened at the same time and the shafts or pole moved bodily to one side.

In order to guard against the loosening of the nuts d', I prefer to provide the movable arm adjacent to said nut with roughened or serrated portions and to provide the arm-engaging side of the nut with a roughened surface to engage the roughened portion of the arm. For instance, I may form these parts as shown in Figs. 5 and 6, in which the arm $C^7$ is provided with a series of radial teeth or ratchets $h$, and the nut is also provided with radial teeth or ratchets $h'$, the said teeth or ratchets being so arranged as to prevent the nut from turning in a direction to unscrew itself from the bolt, and thereby preventing said nut from working loose. This construction may be employed with all the forms of coupling shown and described.

What I claim, and desire to secure by Letters Patent, is—

1. A thill-coupling provided with a rigid arm and a pivoted arm, said rigid arm having a supporting-bolt extending through the coupling-piece secured to the thill and a securing-bolt pivoted to one of said arms, and engaging an aperture or recess in the other arm, and a nut on said bolt for engaging said recessed arm, substantially as described.

2. A thill-coupling having a rigid arm and a movable arm, said rigid arm having a supporting-bolt rigidly secured thereto and extending through the coupling-piece secured to the thill, elastic washers located on said bolt between the coupling-piece and said arms, a screw-threaded bolt pivoted to one of said arms and engaging the other for clamping said arms together upon said washers and coupling-piece, and a nut on said bolt, substantially as described.

3. A thill-coupling having a rigid arm and a pivoted arm, one of said arms being provided with a supporting device for engaging the coupling-piece secured to the thill, a bolt for securing said arms together having one end pivoted to one of said arms, said bolt engaging an aperture or recess in the other arm, and a nut provided with a serrated portion for engaging a serrated portion on said recessed arm, substantially as described.

In testimony whereof I affix my signature in presence of two witnesses.

ANDREW J. McARTHUR.

Witnesses:
J. A. AMMONS,
B. F. JORDAN.